United States Patent [19]
Bernart

[11] Patent Number: 4,991,880
[45] Date of Patent: Feb. 12, 1991

[54] QUICK CONNECT COUPLING WITH TWIST RELEASE

[75] Inventor: René F. Bernart, Homeworth, Ohio

[73] Assignee: Handy and Harman Automotive Group, Inc., New York, N.Y.

[21] Appl. No.: 399,255

[22] Filed: Aug. 28, 1989

[51] Int. Cl.⁵ ............................................. F16L 39/00
[52] U.S. Cl. .................................... 285/321; 285/305
[58] Field of Search ................................. 285/305, 321

[56] References Cited

U.S. PATENT DOCUMENTS

| | | | |
|---|---|---|---|
| 2,805,089 | 9/1957 | Hansen | 285/321 X |
| 2,901,269 | 8/1959 | Rickard | 285/321 X |
| 3,428,340 | 2/1969 | Pelton | 285/321 X |
| 3,453,005 | 7/1969 | Foults | 285/321 X |
| 3,584,902 | 6/1971 | Uyse | 285/305 |
| 3,759,553 | 9/1973 | Carter | 285/305 X |
| 4,772,052 | 9/1988 | Morain | 285/305 |

FOREIGN PATENT DOCUMENTS 1266071 4/1968 Fed. Rep. of Germany ...... 285/305

Primary Examiner—Dave W. Arola
Assistant Examiner—Carol I. Bordas
Attorney, Agent, or Firm—Head and Johnson

[57] ABSTRACT

An improved readily attachable and detachable coupling for fluid conduits including a receptacle member having a passageway therethrough and having at least one notch formed in the external surface communicating with the passageway, the notch having a forward wall inclined at an acute angle to the member longitudinal axis and a rearward wall which is substantially perpendicular to the longitudinal axis, and a plug member of a diameter to be slideably received within the receptacle member passageway, the plug member having an enlarged external diameter portion spaced from the end, the receptacle member having a retention wire received thereon with a straight portion extending within the notch and with the wire extending less than the full circumference of the receptacle, the ends of the wire being spaced apart so that when the plug member is inserted into the receptacle passageway, the enlarged diameter portion can push past the retention wire, and a release collar received on receptacle and having a portion which engages one of the wire ends when the release collar is rotated to expand the wire straight portion outwardly to permit the plug member enlarged diameter portion to pass rearwardly of the wire.

11 Claims, 2 Drawing Sheets

QUICK CONNECT COUPLING WITH TWIST RELEASE

SUMMARY OF THE INVENTION

This disclosure is directed toward an improved quick connect coupling of the type disclosed in U.S. Pat. No. 4,772,052 issued Sept. 20, 1988 and entitled "QUICK CONNECT COUPLING." This patent shows a type of readily attachable coupling for fluid conduits including a receptacle member and a plug member. The receptacle member is arranged to expeditiously receive and accept a plug member so that two fluid conducting members may be expeditiously connected. The apparatus of U.S. Pat. No. 4,772,052 is particularly useful in connecting fluid-carrying small diameter tubing such as used in automobiles although the invention certainly is not limited to this application. The quick connect coupling of U.S. Pat. No. 4,772,052 provides a substantially fail-safe connection of two tubular members and includes means whereby the tubular members may be disconnected utilizing a supplemental tool, such as a screw driver or the like.

U.S. Pat. No. 4,772,052 is incorporated herein by reference. The present disclosure provides a quick connect and disconnect coupling having the convenience and fail-safe features of the coupling disclosed in U.S. Pat. No. 4,772,052, but having significant and substantial improvements. One of the improvements incorporated in the present disclosure is the provision of means to duplicate the connecting mechanism so that if one of the connecting mechanisms fails, the other is in place to prevent inadvertent disconnection. Thus, the disclosure of the present quick connect coupling even further improves the fail-safe aspect of the quick connect coupling of U.S. Pat. No. 4,772,052. In addition, an important feature of the present disclosure is means whereby the tubular members can be quickly and easily disconnected without the use of tools.

The present quick connect and disconnect coupling for fluid conduits includes a receptacle member having a passageway through it coincident with the member longitudinal axis. The passageway has an enlarged internal diameter portion adjacent one end. At least one notch is formed in the receptacle member adjacent the end. The notch extends from the member external surface into the enlarged internal diameter portion of the passageway. The notch is defined by two generally planar surfaces. The first notch surface plane is inclined in the direction towards the member first end at an acute angle relative to the passageway longitudinal axis. The plane of the second surface of the notch is in a direction towards the member second end and is preferably generally perpendicular to the passageway longitudinal axis.

In an improved embodiment of the present disclosure, two of such notches are formed in the receptacle member preferably placed about 180° apart. Each of the notches is formed in the manner described, that is, each notch is defined by two generally planar surfaces with the first surface being in a plane positioned in the direction towards the member first end and the second surface inclined at an acute angle relative to the passageway longitudinal axis.

A tubular plug member is employed having a cylindrical forward end portion with an external diameter less than the internal diameter of the receptacle member enlarged internal diameter portion. The plug member is also further defined by an enlarged external diameter portion spaced from the forward end. The diameter of the enlarged portion is slightly less than the internal diameter of the receptacle member enlarged internal diameter portion. A retention wire is positioned about the receptacle member for each of the notches formed in the receptacle member. That is, if the receptacle member has one notch as described, there is one retention wire and if it has two notches, there are two retention wires. The retention wire associated with each notch has a generally straight portion extending within the notch with the balance of the wire wrapped on the receptacle member external surface but not completely around the external surface, leaving the ends of each of the wires spaced apart from each other.

Gasket elements are positioned within the receptacle member passageway to snuggly receive the plug member forward end portion.

Received on the external surface of the receptacle member is a tubular releasing collar. The release collar has inwardly extending wire engaging portions which, upon rotation of the collar, engage one of the ends of the retention wire or one of the ends of each of the retention wires where two such retention wires are employed. Rotating the release collar causes the straight portion of the retention wire received within each notch are to displace radially outwardly with respect to the passageway longitudinal axis. This permits the plug member enlarged external diameter portion to be withdrawn past the retention wire or wires, and thereby allows the plug member to be separated from the receptacle member.

In the preferred arrangement the release collar has means to engage one end of each retention wire irrespective of the direction of rotation of the releasing collar so that thereby the plug member may be disengaged from the receptacle member by rotating the release collar in either direction.

The prior art is replete with devices for connecting and disconnecting tubular members, and for reference to background prior art the following prior issued patents are considered to be the best prior art known to the applicant: U.S. Pat. Nos.: 921,691; 2,441,344; 3,314,696; 3,453,005; 3,534,988; 3,538,940; 3,584,902; 3,574,359; 3,628,768; 3,711,125; 3,724,882; 3,826,523; 4,005,883; 4,009,896; 4,123,089; 4,123,091; 4,128,264; 4,635,974; 4,772,052; German Patents: 2028711; and 2622269; UK Patent 1,030,535;

A better and more complete understanding of the invention will be had by reference to the following description and claims, taken in conjunction with the attached drawings.

DESCRIPTION OF THE PREFERRED EMBODIMENT

Figure 5:
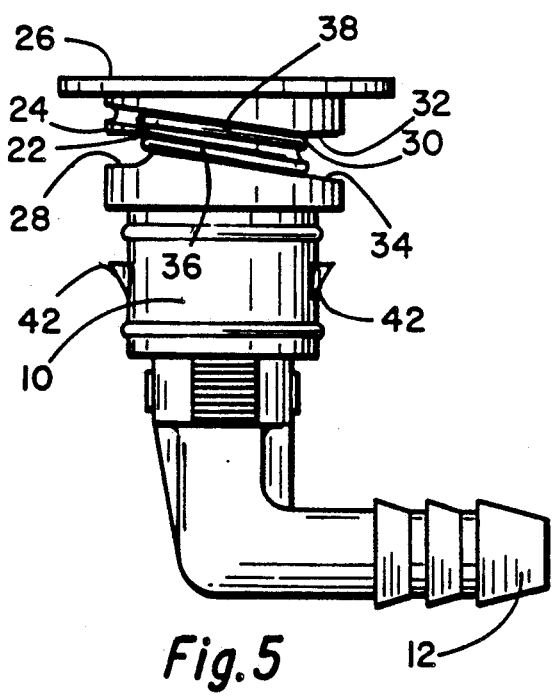
FIG. 5 is an external elevational view of the receptacle member as shown in FIG. 1, but with the releasing collar removed to show more details of the receptacle member.

Referring to the drawings and first to FIG. 5, a receptacle member is indicated by the numeral 10 and forms one-half of the basic quick connect and disconnect fitting of this disclosure. The receptacle member 10 is provided with a tube engaging portion 12 by which the receptacle member may be attached to a conduit. The illustration of the tube engaging portion 12 is by example only as the receptacle member may have any standard device for attachment to another tubular member such as a threaded fitting or the like. Further, in the illustrated arrangement the tube engaging portion 12 extends at right angles to the body of the receptacle member 10, but this also is by way of example since it could obviously be in alignment with the body.

Figure 13:
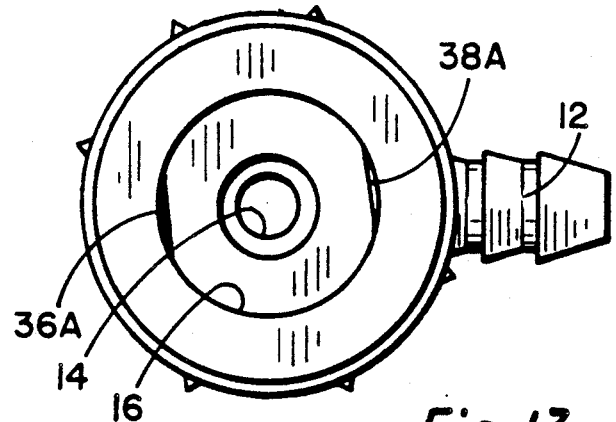
FIG. 13 is an end view as in FIG. 12, but showing the release collar having been rotated to displace the retention wires so as to permit the plug member to be withdrawn.
Figures 3, 4:
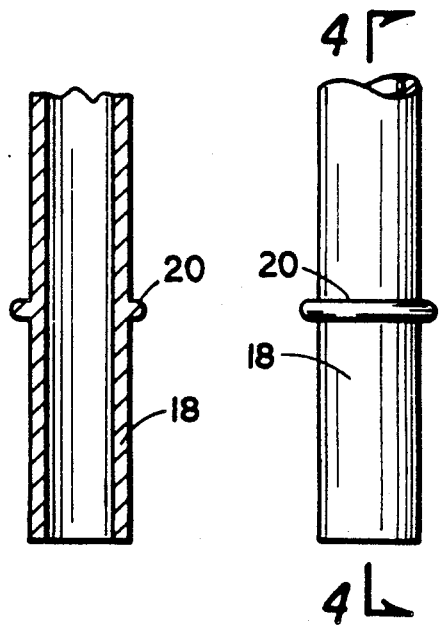
FIG. 3 is an elevational view of a plug member as utilized with the receptacle member of FIGS. 1 and 2.
FIG. 4 is a cross-sectional view of a plug member as taken along the line 4—4 of FIG. 3.
Figure 7:
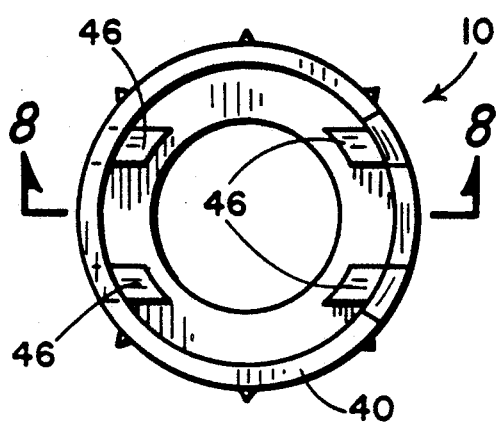
FIG. 7 is an end view of the release collar of FIG. 6 as taken along the line 7—7 of FIG. 6.
Figure 8:
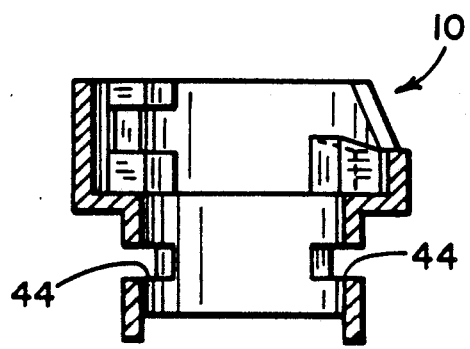
FIG. 8 is a cross-sectional view of the release collar as taken along the line 8—8 of FIG. 7.
Figure 6:
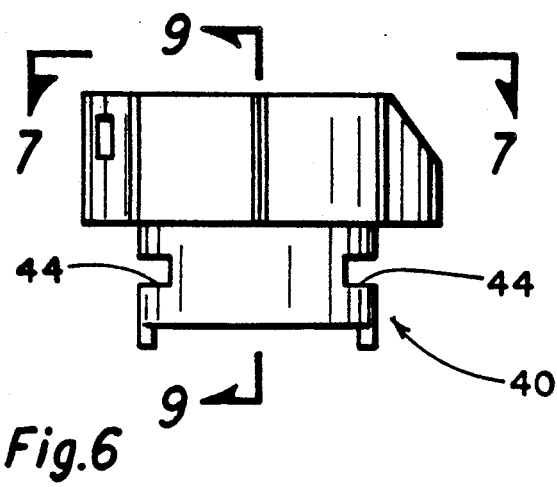
FIG. 6 is an elevational external view of a releasing collar which is rotatably received on the receptacle member of FIG. 5.
Figure 9:
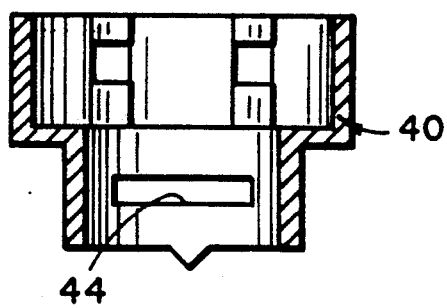
FIG. 9 is another cross-sectional view of the release collar as in FIG. 8 with the cross-sectional view taken through a plane 90° displaced from the plane of FIG. 8.

The receptacle member 10 has a passageway 14 therethrough (See FIGS. 12 and 13) and the passageway includes an enlarged diameter portion 16. The passageway 14 includes sealing means (not shown) such as an O-ring or the like, as described in U.S. Pat. No. 4,772,052, to sealably receive the plug member 18 as shown in FIGS. 3 and 4. The plug member 18 has an enlarged diameter portion 20 which is telescopically receivable within the receptacle member enlarged diameter portion 16.

As shown in FIG. 5, the receptacle member has, formed in the external cylindrical surface thereof, a first notch 22 which is defined by a forward wall 24 in the direction towards the receptacle member first end 26. The first or forward wall 24 is in a plane substantially perpendicular to the axis of passageway 14. The first notch 22 is further defined by a rearward wall 28 which is in a plane intersecting the receptacle member longitudinal axis at an acute angle.

The receptacle member also has a second notch 30 which is displaced from the first notch 22, preferably by about 180°. The second notch 30 has, like the first notch, a forward wall 32 preferably in a plane normal to the axis of the passageway 14, and a rearward wall 34 which intersects the axis of the passageway at an acute angle.

Figure 10:
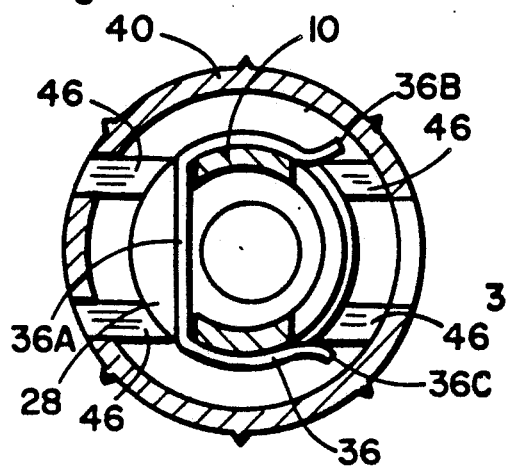
FIG. 10 is a cross-sectional view taken along 10—10 of FIG. 1 showing the relationship between the release collar and the retention wire ends.

Received in the first notch 22, as best seen in FIG. 10, is the straight portion 36A of a first retention wire 36. The retention wire is formed partially about the external surface of the receptacle member 10, but does not encompass it so that the retention wire 36 has a first end 36B and a second end 36C. The ends are spaced apart from each other and preferably the wire is bent out adjacent the ends 36B and 36C. While not shown in FIG. 10, the second notch 30 also receives a retention wire 38 which has a straight portion and opposed end portions. The quick connect and disconnect coupling may be easily designed so that the first and second retention wires 36 and 38 are interchangeable.

Figure 12:
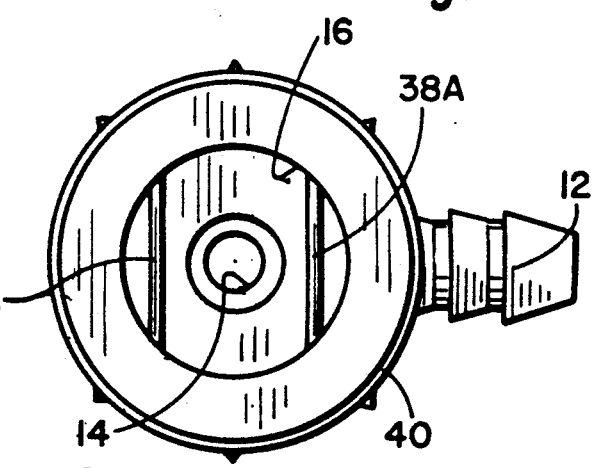
FIG. 12 is an end view of the plug member having the release collar thereon as taken along the line 12—12 of FIG. 1 and showing the retention wires in the normal position for retaining a plug member in the connection.
Figure 2:
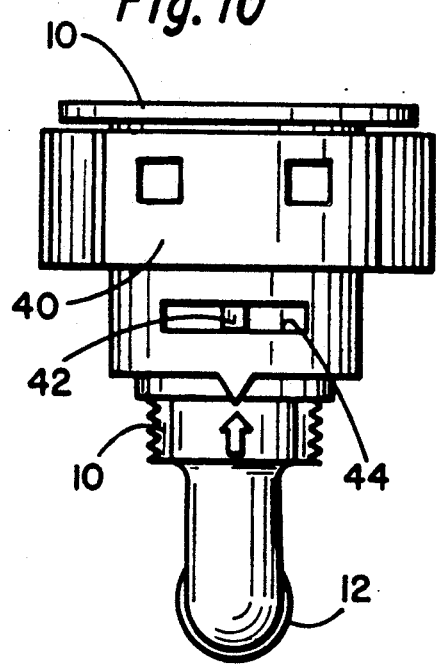
FIG. 2 is another elevational view as in FIG. 1 taken along the lines 2—2 of FIG. 1.
Figure 1:
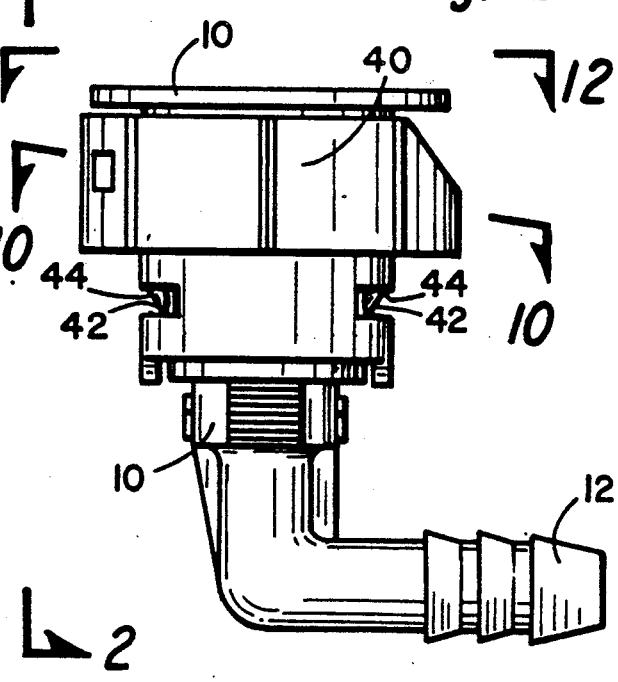
FIG. 1 is an external elevational view of a preferred embodiment of the receptacle member portion of the quick connect and disconnect coupling of this disclosure.

FIG. 12 shows the straight portion 36A of the first retention wire and the straight portion 38A of the second retention wire. The retention wires are held by spring action within their respective notches 22 and 30, but the straight portions 36A and 38A are radially outwardly displaceable as the enlarged diameter portion 20 of the plug member 18 passes between the wires in a manner which is fully described in U.S. Pat. No. 4,772,052. However, after the enlarged diameter portion 20 of the plug member has passed the retention wires 36 and 38, the plug member cannot then be inadvertently withdrawn since the wire straight portion 36A and 38A prevent the repassage of the enlarged diameter portion of the plug member.

Thus, with respect to the receptacle member 10, compared to the receptacle member described in U.S. Pat. No. 4,772,052, the significant improvement therein is the employment of two notches 22 and 30 and two retention wires 36 and 38 so that the coupling is made even more fail-safe; that is, the employment of two notches with the complementary retention wires adds double assurance that the plug member cannot be inadvertently withdrawn from the receptacle member.

The second basic improvement of the present invention is the means of quickly releasing the plug member from retention by the receptacle member. For this purpose, rotatably received upon the receptacle member is a release collar 40. The releasing collar is not concerned with fluid transmission, and, therefore, can generally be loosely fitted upon the receptacle member. As shown in FIG. 5, formed on the exterior of the receptacle member 10 are opposed inclined projections 42. Formed in the tubular release collar 40 are opposed partially circumferential slots 44. The release collar 40 can be slid upon the receptacle member 10. The inclined projections 42 snap within slots 44 so that the release collar is held on the receptacle member, but is permitted to rotate within the limits defined by slots 44.

Integrally formed in the release collar are inwardly extending wire engaging portions 46. Since in the embodiment illustrated, two notches 22 and 30 are employed with two retention wires 36 and 38, there are four such wire engaging portions 46, that is, one for each of the wire ends, such as 36B and 36C of retention wire 36.

Figure 11:
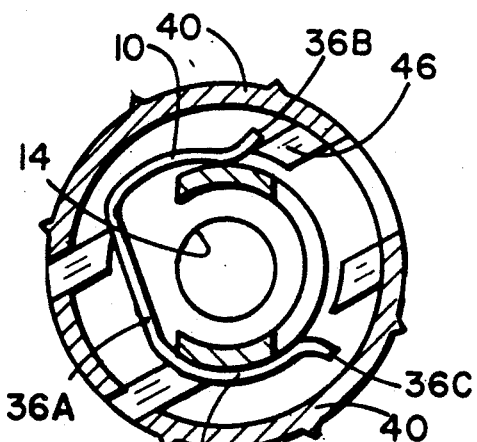
FIG. 11 is a cross-sectional view as in FIG. 10, but showing the release collar having been rotated to displace the retention wire to permit the plug member to be withdrawn.

When the release collar 40 is rotated, a wire-engaging portion 46 engages one of the ends of each of the retention wires 36 and 38, as illustrated in FIG. 11, to displace the wire and more particularly, to displace the straight portions 36A and 38A received within notches 22 and 30, respectively. FIG. 12 shows the retention wire straight portion 36A and 38A with the releasing collar 40 in its normal or non-rotated position, but FIG.

13 shows the retention wire straight portions 36A and 38A as radially outwardly displaced by the rotation of the releasing collar. It can be seen that this allows the plug member enlarged diameter portion 20 to be withdrawn past the retention wires and the plug member 18 to be removed from connection with the receptacle member 10.

It can be seen that the quick connect aspect of the coupling of this disclosure functions in the same way described in U.S. Pat. No. 4,772,052 except for the provision of a back-up or duplicative feature to further insure the fail-safe connection of the connector by the employment of two spaced-apart notches 22 and 30, each receiving a retention wire 36 and 38. In addition, the connector of this disclosure includes the feature of rapid and easy disconnect which is achieved by the rotation of the release collar 40 in either direction. Other than the provision of one or more gaskets or O-ring members, a coupling is formed of only five elements, that is, the receptacle member 10 which can be cast of plastic, the plug member 18 which may be made of plastic or metal, the retention wires 36 and 38 which are preferably formed of metal, and the release collar 40 which can be cast of plastic. The entire coupling can easily be assembled after the cast products are provided by inserting the retention wires 36 and 38 in position on the exterior body of the receptacle member 10 with the straight portions 36A and 36B received within the notches 22 and 30, after which the tubular release collar is snapped in position.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A readily attachable and detachable coupling for fluid conduits, comprising:
    a receptacle member having a passageway therethrough coincident with a longitudinal axis and having a first end, the passageway having an enlarged internal diameter portion adjacent said first end, the receptacle member having a notch formed therein, the notch extending from the receptacle member exterior surface into said enlarged diameter passageway, and having a forward wall in the direction towards said first end and a rearward wall in the direction away from said first end, the rearward wall being in a plane intersecting said receptacle member longitudinal axis at an acute angle and the forward wall being in a plane intersecting the receptacle member longitudinal axis substantially radially thereof;
    a tubular plug member having a forward end portion having an external diameter less than said receptacle member passageway and being slidably receivable within said receptacle member, the plug member having adjacent to and spaced from said forward end a short length, radially extending, enlarged, external diameter portion, the enlarged diameter portion being slideably receivable within said enlarged internal diameter portion of said receptacle member passageway;
    a retention wire having opposed ends received about said receptacle member and fixed axially thereto and having a generally straight portion received within said notch and the balance of said wire in both directions away from said straight portion being curved around at least a substantial portion of, but less than all of the external circumferential surface of said receptacle member, the opposed ends of said retention wire being thereby displaced away from said substantially straight portion, said plug member being insertable within said receptacle member passageway, the enlarged diameter portion displacing said straight portion of said retention wire outwardly and on said rearward wall, and after the enlarged diameter portion passes the wire straight portion, the wire portion returns to a seated position rearwardly of said enlarged diameter portion to thereby retain said plug member within said receptacle member; and
    means carried by said receptacle member of engaging one of said ends of said retention wire and displacing said engaged end in the direction towards said straight portion to thereby displace said retention wire straight portion within said notch outwardly relative to said receptacle member passageway and away from said seated position whereby said enlarged diameter portion of said plug member may pass said retention wire to enable said plug member to be withdrawn from said receptacle member.

2. An improved coupling according to claim 1 wherein said means of engaging one of said ends of said retention wire includes a release collar means rotatably received on said receptacle member.

3. An improved coupling according to claim 2 wherein said release collar means is tubular and rotatably received on said receptacle member and includes at least one inwardly extending release member portion which, upon rotation of said releasing collar, engages said one end of said wire.

4. An improved coupling according to claim 2 wherein said release collar has means upon rotation of said collar in one direction relative to said receptacle member to engage one said end of said wire, and upon rotation in the other direction to engage the other said end of said wire whereby said retention wire straight portion may be outwardly displaced by rotation of said release collar in either direction.

5. An improved readily attachable and detachable coupling for fluid conduits, comprising:
    a receptacle member having a passageway therethrough coincident with a longitudinal axis and having a first end, the passageway having an enlarged internal diameter portion adjacent said first end, the receptacle member having first and second spaced apart notches formed therein, each notch extending from the receptacle member exterior surface into said enlarged diameter passageway, each notch having a forward wall in the direction towards said first end and a rearward wall in the direction away from said first end, the rearward wall of both said notches being in a common plane intersecting said receptacle member longitudinal axis substantially radially thereof;

a tubular plug member having a forward end portion having an external diameter less than said receptacle member passageway and being slidably receivable within said receptacle member, the plug member having adjacent to and spaced from said forward end a short length, radially extending circumferentially enlarged external diameter portion spaced from said forward end, the enlarged diameter portion being slideably receivable within said enlarged internal diameter portion of said receptacle member passageway; and first and second retention wires received partially about said receptacle member and fixed axially thereto and each wire having a generally straight portion which is received within a said notch, said plug member being insertable within said receptacle member passageway, the enlarged diameter portion displacing said straight portion of each said retention wire outwardly and on said rearward wall of each said notch, and after the enlarged diameter portion passes the wire straight portions, the wire straight portions each return to a seated position rearwardly of said plug member enlarged diameter portion to thereby retain said plug member within said receptacle member, said first and second notches being spaced about 180° from each other about said receptacle member passageway longitudinal axis and said straight portions of both said retention wires being in a common plane intersecting the receptacle member longitudinal axis substantially radially thereof.

6. An improved coupling according to claim 5 wherein said retention wires are each substantially straight in said portion received in said notches and each curves around at least a substantial portion of, but less than all of the balance of the external circumferential surface of said receptacle member.

7. A coupling according to claim 5 wherein said receptacle has a first and second circumferential recess in the exterior surface thereof in a plane substantially perpendicular said longitudinal axis and coincident with said notches, said retention wires being received in said notches and in said recesses.

8. An improved readily attachable and detachable coupling for fluid conduits, comprising:

a receptacle member having a passageway therethrough coincident with a longitudinal axis and having a first end, the passageway having an enlarged internal diameter portion adjacent said first end, the receptacle member having first and second spaced apart notches formed therein, each notch extending from the receptacle member exterior surface into said enlarged diameter passageway, each notch having a forward wall in the direction towards said first end and a rearward wall in the direction away from said first end, the rearward wall of each notch being in a common plane intersecting said receptacle member longitudinal axis at an acute angle and the forward wall of each notch being in a plane intersecting the receptacle member longitudinal axis substantially radially thereof;

a tubular plug member having a forward end portion having an external diameter less than said receptacle member passageway and being slidably receivable within said receptacle member, the plug member having a short length, radially extending circumferentially enlarged external diameter portion spaced from said forward end, the enlarged diameter portion being slideably receivable within said receptacle member enlarged internal diameter passageway;

first and second retention wires each having opposed ends and being received about said receptacle member and fixed axially thereto and each wire having a generally straight portion which is received within a said notch and the balance of each wire in both directions away from said straight portion being curved around at least a substantial portion of, but less than all of the external circumferential surface of said receptacle member, the opposed ends of each said retention wire being thereby displaced away from said substantially straight portion, said plug member being insertable within said receptacle member passageway, the enlarged diameter portion displacing said straight portion of each said retention wire outwardly and on said rearward wall of each said notch, and after the enlarged diameter portion passes each of said wire straight portions the wire straight portions each returns to their seated positions rearwardly of said enlarged plug member diameter portion to thereby retain said plug member within said receptacle member; and means carried by said receptacle member of simultaneously engaging one of each said ends of each of said retention wires and displacing said engaged ends in the direction towards said straight portions to thereby displace said retention wires straight portions within said first and second notches outwardly relative to said receptacle member passageway and away from said seated positions whereby said enlarged diameter portion of said plug member may pass said retention wires to enable said plug member to be withdrawn from said receptacle member.

9. An improved coupling according to claim 8 wherein said means of engaging one of said ends of each of said retention wires includes:

a release collar means rotatably received on said receptacle member.

10. An improved coupling according to claim 9 wherein said release collar means is tubular and rotatably received on said receptacle member and includes at least one inwardly extending release member for each said retention wire which, upon rotation of said releasing collar, engages a said end of each of said retention wires.

11. An improved coupling according to claim 9 wherein said release collar has means upon rotation of said collar in one direction relative to said receptacle member to engage substantially simultaneously one end of each of said wires, and upon rotation in the other direction to engage substantially simultaneously the other end of each of said wires whereby said retention wire straight portions may be simultaneously outwardly displaced by rotation of said release collar in either direction.

* * * * *